United States Patent [19]

Craig

[11] Patent Number: 5,186,276
[45] Date of Patent: Feb. 16, 1993

[54] PORTABLE HUNTING TREE STAND

[76] Inventor: Charles R. Craig, 4 Truesdale Ave., South Newport, Ky. 41071

[21] Appl. No.: 697,976

[22] Filed: May 10, 1991

[51] Int. Cl.⁵ .............................. E604 5/00; A45F 3/00
[52] U.S. Cl. .................................. 182/187; 124/23.1; 182/129
[58] Field of Search ............... 182/187, 188, 128, 136, 182/133; 124/23.1, 88; 248/316.7, 539, 534, 61, 231.7; 224/916

[56] References Cited

U.S. PATENT DOCUMENTS

| | | | |
|---|---|---|---|
| 2,656,140 | 10/1953 | Petruschell | 248/316.7 |
| 3,871,482 | 3/1975 | Southard | 182/187 |
| 4,230,296 | 10/1980 | Staley et al. | 182/187 X |
| 4,331,216 | 5/1982 | Amacker | 182/136 X |
| 4,360,179 | 11/1982 | Roberts | 124/23.1 X |
| 4,542,873 | 9/1985 | Matherly et al. | 124/23.1 X |
| 4,708,221 | 11/1987 | Kubiak | 182/187 |
| 4,727,961 | 3/1988 | Dawson | 182/187 |
| 4,729,363 | 3/1988 | Skyba | 124/23.1 |
| 4,813,441 | 3/1989 | Kepley | 182/187 X |
| 4,889,307 | 12/1989 | Klansek | 124/88 X |
| 4,936,415 | 6/1990 | Williams | 182/187 |

OTHER PUBLICATIONS

Warren and Sweat Catalog 1990.

Cabela's Catalog, Fall 1990, pp. 144–146.

Primary Examiner—Karen J. Chotkowski
Attorney, Agent, or Firm—Wood, Herron & Evans

[57] ABSTRACT

A portable hunting tree stand adapted to be removably connected to a tree trunk comprising a platform, a seat, at least one frame member connected between the seat and platform, and arm means connected to the frame member for hanging a hunting bow thereon so that a hunter's hands may remain free and unencumbered while the hunter is seated atop the seat and while the bow is not in use, and wherein the bow is easily reached by the hunter when the hunter desires to use the bow. The arm means is an arm pivotally connected to a frame member, and includes a U-shaped bracket connected thereto wherein a bow may be removably placed therein. In another embodiment, the tree stand comprises a platform, a seat, at least a first frame member connected between the seat and the platform, at least a second tubular frame member connected to the first frame member, and arm means connected to the tubular member by inserting one end into the tubular member. In another embodiment, the tree stand comprises a platform, a seat, at least one frame member connected between the seat and platform, at least one cable connected between the frame member and the platform, and arm means connected to the cable.

13 Claims, 3 Drawing Sheets

PORTABLE HUNTING TREE STAND

FIELD OF THE INVENTION

This invention relates to sporting equipment. More particularly, this invention relates to portable tree stands commonly used during hunting, such as deer hunting.

BACKGROUND OF THE INVENTION

Portable hunting tree stands are well known in the art, and have met with widespread commercial success in the marketplace. These types of portable hunting tree stands are often sold through sporting goods retail establishments, and through mail order via sporting goods catalogs.

Portable tree stands allow a hunter to gain a vantage point for the purposes of better viewing his surroundings by perching atop the stand which is removably secured to a tree trunk. Furthermore, these types of stands do not limit a hunter to a specific hunting location, as do fixed, or permanent hunting stands or blinds.

Typically, a portable tree stand comprises a platform, a seat, and one or more frame members which connect the seat to the platform. Ordinarily these frame members are collapsible to allow the platform and seat to be folded into a compact configuration for transportation.

At the upper end of the stand, usually adjacent the seat, there is a chain or strap used to encircle the trunk of a tree. At the rearwardmost edge of the platform one or more frame members have, for example, sharpened ends which will embed in or otherwise grip a tree trunk. When such a stand is secured to a tree trunk with the above-mentioned strap or chain, and when a hunter is either standing on the platform or seated atop the seat, the moment or couple generated by the weight of the hunter offset from the trunk of the tree causes the rear edge of the platform to "bite" into the trunk, while the stand is prevented from rotating due to the strap or chain being secured to the trunk. In this manner the stand remains secured to the tree trunk. The portable stand may merely be separated from the tree trunk, and packed to another location for securement to another tree trunk, as desired.

Portable hunting tree stands have met with especially widespread success among bow hunters. Due to the nature of bow hunting, the equipment dictates that shots be taken at game usually in the range of 10–40 yards. A shot taken at greater than 40 yards is considered a very difficult long shot. Furthermore, the nature of bow hunting, especially as it relates to deer hunting, dictates that hunters must pursue their quarry in relatively thick cover, in order to get within the above-mentioned range of the game animals. Since hunting from the ground has inherent disadvantages, i.e., game can readily scent humans on the ground, and because of the limited visibility at ground level, the portable tree stand became ideal for the bow hunter wishing to gain a height and scent advantage over wilely game animals such as deer.

Even though such stands have met with widespread commercial success, and especially among bow hunters, nonetheless these portable types of hunting tree stands have an inherent disadvantage in that a hunter seated atop such a stand must continually hold his hunting bow in his hands. Such stands are not equipped with any means for hanging or resting the hunting bow. Oftentimes it is desirable for the hunter to glass his surroundings with binoculars, or to estimate the range to potential shot openings in the brush with a range finder. However, this requires, normally, the use of both hands to operate the pair of binoculars or the range finder. Since deer hunting from a stand ordinarily requires a hunter to spend many long hours on the stand in order to increase his odds of seeing game, it is common for hunters to bring thermoses of coffee, lunches and the like to the stand. Handling of these items likewise normally requires both hands, which is very difficult because the hunter must continually clutch his bow.

SUMMARY OF THE INVENTION

It would therefore be desirable to provide a portable tree stand wherein a hunter's bow could be removably supported thereon, thus allowing the hunter free use of both hands. It would further be desirable for the hunter's bow to be readily accessible in the event that game is suddenly sighted.

It has therefore been a main objective of the present invention to provide a portable hunting tree stand which includes means to hang a hunting bow thereon so that a hunter's hands may remain free and unencumbered while the hunter is seated on the stand and while the bow is not in use, and wherein the bow is easily reached by the hunter when the hunter desires to use the bow.

In accordance with the main objective of the present invention, and in a primary embodiment, the present invention is directed to a portable hunting tree stand adapted to be removably connected to a tree trunk comprising a platform, a seat, at least one frame member connected between the seat and platform, and arm means connected to the frame member for hanging a hunting bow thereon so that a hunter's hands may remain free and unencumbered while the hunter is seated atop the seat and while the bow is not in use, and wherein the bow is easily reached by the hunter when the hunter desires to use the bow.

The arm means is an arm pivotally connected on a first end to the frame member permitting it to pivot between a first compact storage position generally adjacent and parallel the frame member and a second position generally perpendicular to the frame member for use. In this embodiment the arm is an angle section structural member which includes a generally U-shaped bracket connected to a second end wherein the bow may be removably placed in the bracket. Ideally, the bracket is rubber coated so as to muffle sound when the bow is placed into or removed from the bracket, and to prevent marring of the bow.

In another embodiment of the present invention, the portable hunting tree stand comprises a platform, a seat, at least a first frame member connected between the seat and the platform, at least a second tubular frame member connected to the first frame member, and arm means connected on a first end to the second tubular member by inserting the first end into the second tubular member. The arm means comprises a tubular section structural member, and likewise includes a generally U-shaped bracket on a second end which ideally is rubber coated so as to muffle sound, and prevent marring of the bow.

In yet another embodiment of the present invention, the portable hunting tree stand comprises a platform, a seat, at least one frame member connected between the seat and the platform, at least one cable connected between the frame member and the platform, and arm means connected on a first end to the cable, which arm means comprises an angle section structural member, and which includes a bracket connected to a second end, which bracket is generally U-shaped, and ideally is rubber coated.

The invention accomplishes the objective of providing a portable hunting tree stand with a support or means for hanging a hunting bow thereon, while fully retaining the portable compact nature of the stand. The arm pivots to a storage position adjacent the frame member to which it is connected for effecting a compact configuration. The tubular arm can be merely slipped out of the tubular frame member into which it is received when the stand is collapsed or folded for transportation. And the arm connected to a cable of a tree stand can be neatly tucked between the seat and platform when they are folded, due to the flexible nature of the cable, for effecting a compact storage configuration. Furthermore, the safety of a hunter seated atop the tree stand of the present invention is enhanced by allowing for full uninterrupted use of both hands.

One advantage of the present invention is that a hunter may readily support or hang his bow on his portable hunting tree stand so as to allow both hands to be free, but yet may quickly gain access to the bow should game be sighted.

Another advantage of the present invention is that portable hunting tree stands may be quickly and inexpensively retrofitted with a bow support, either during the original manufacture thereof or as an after-market add-on.

Yet another advantage of the present invention is that a hunter may safely attend to other activities, such as adding or removing clothing or the like, without having to simultaneously hold a hunting bow.

These and other objects and advantages of the present invention will become more readily apparent to those skilled in the art to which the subject matter pertains during the following detailed description taken in conjunction with the drawings herein, in which:

DESCRIPTION OF PREFERRED EMBODIMENTS

Figure 1:
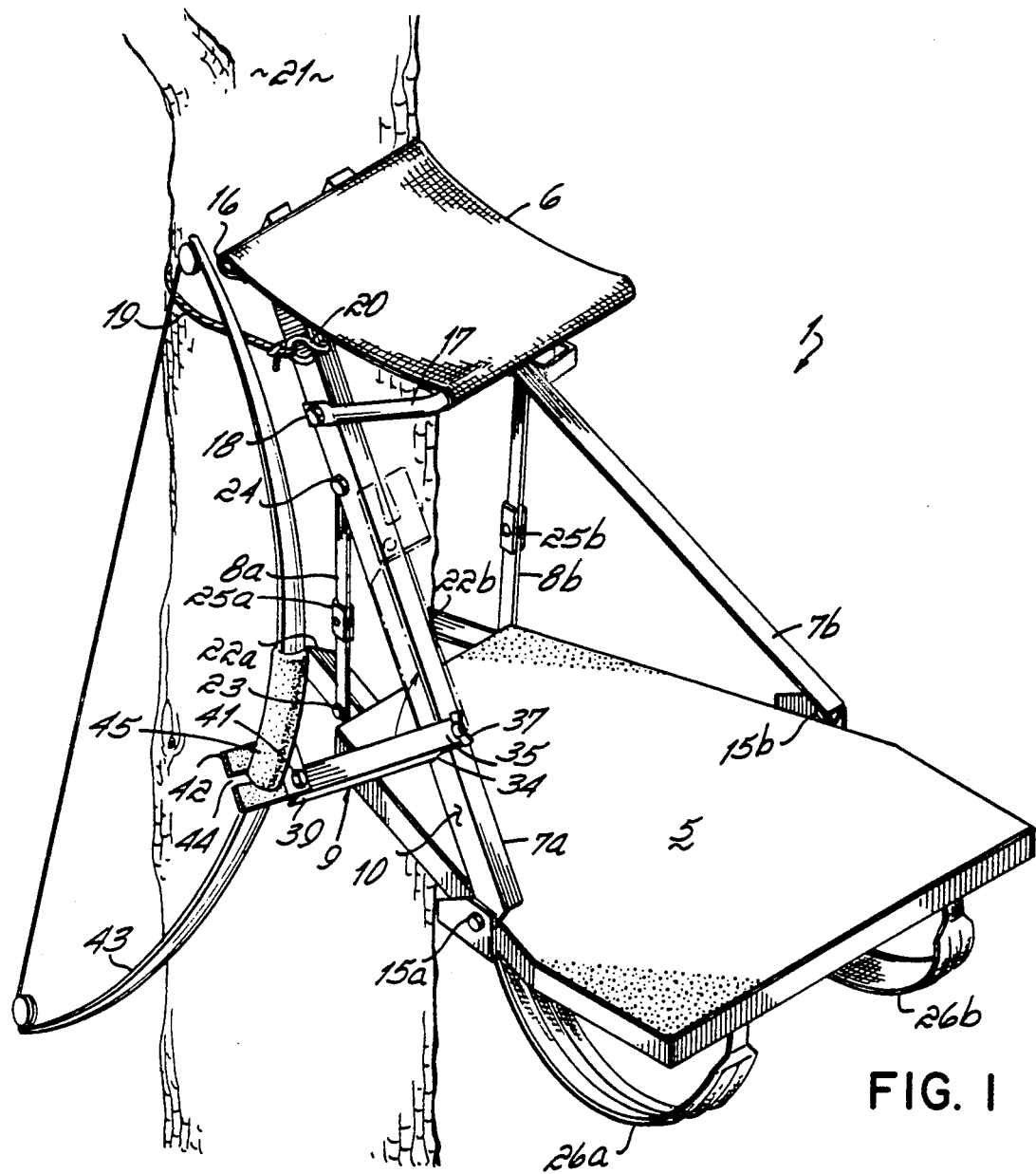
FIG. 1 is a perspective view of the portable hunting tree stand of the present invention.

With reference to FIG. 1, there is illustrated a portable hunting tree stand 1 of the present invention. The tree stand 1 comprises, generally, a platform 5, a seat 6, diagonal frame members 7a and 7b connected between the platform 5 and the seat 6, vertical frame members 8a and 8b connected between the platform and the diagonal frame members 7a and 7b, and a novel bow support 9.

The diagonal frame members 7a and 7b are pivotally connected to the platform 5 via pivots 15a and 15b. The upper ends of the diagonal frame members 7a and 7b have fixedly attached thereto a tubular frame member 16 around which is wrapped a suitable fabric, such as heavy duty canvas, or nylon (an example of which is Cordura (registered trademark)), to form the seat 6. This fabric is similarly wrapped around another tubular generally U-shaped frame member 17 to form the front edge of the seat.

This frame member 17 is pivotally connected to the diagonal frame member 7a and 7b with pivots, one of which is shown at 18. At the upper ends of the diagonal frame members there is attached thereto a cord or chain 19 with hooks, one of which is shown at 20. This chain 19 secured to the tree trunk 21, in combination with the pointed members 22a and 22b extending rearwardly from the platform 5 provides a sufficient "bite" produced by the couple or moment generated by the weight of the hunter atop the platform 5 and seat 6 to secure the stand 1 to the tree trunk 21.

Vertical frame members 8a and 8b are pivotally connected on their lower and upper ends to the members 22a and 22b and the members 7a and 7b with pivots, two of which are illustrated at 23 and 24, respectively. These vertical members 8a and 8b include hinges 25a and 25b, respectively, located intermediate the ends of these members which facilitate folding the members 7a and 7b into a generally planar relationship with the platform 5 for transportation. The stand 1 further includes straps 26a and 26b to aid in transporting the stand 1 from one location to another, backpack style.

Figure 2:
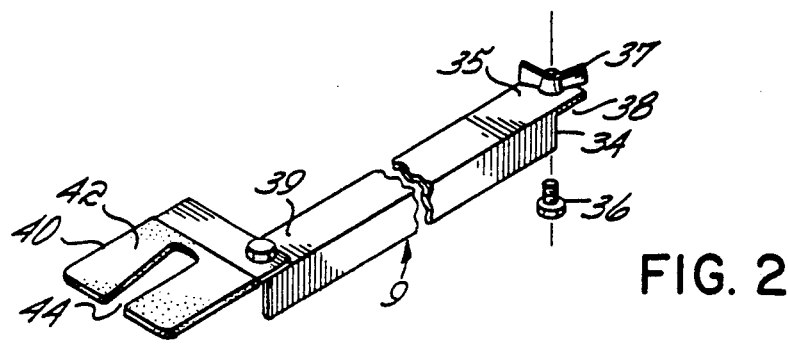
FIG. 2 is a perspective view of the bow supporting pivoted arm and generally U-shaped bracket of FIG. 1.

Referring now to FIGS. 1 and 2, bow holder or support 9 comprises an angle structural member pivoted on a first end 35 to one of the diagonal frame members, and as illustrated, diagonal frame member 7a. This first end 35 is pivoted (phantom lines, FIG. 1) by virtue of its connection to the frame member 7a with, for example, a standard bolt 36 and wing nut 37. The end 35 of the bow support 9 is relieved at 38 to allow the support 9 to pivot to a substantially right angle relationship with the frame member 7a. During use the edge 34 of the relieved portion 38 engages and rests against the side wall 10 of frame member 7a. Gravity maintains the edge 34 of support 9 in contact with side wall 10 of frame member 7a thereby maintaining a 90° relationship between the frame member 7a and arm 9. Generally U-shaped bracket 40 is fixed to a second end 39 of support 9, as by way of bolt 41. Alternatively, bracket 40 may also be welded to end 39. This bracket 40 is dipped or otherwise coated with a thin rubber film or coating 42 so as to muffle sound when the bow 43 is placed into or removed therefrom, and to prevent marring of the bow 43. The slot 44 of this bracket 40 is sized so as to be slightly wider than the thickness of the bow 43 adjacent the lowermost edge of the bow handle 45 so that the bow 43 will not twist when positioned therein. The bow handle 45 rests on the planar surface of the bracket 40 when supported therein. Alternatively, bow 43 could be raised to that the bow 43 is positioned in the bracket 40 approximately midway between the handle 45 and the lower tip of the bow 43. The weight of the bow 43 would cause it to tip forward, and the slot 44 would maintain the bow 43 in this canted orientation.

Figure 3:
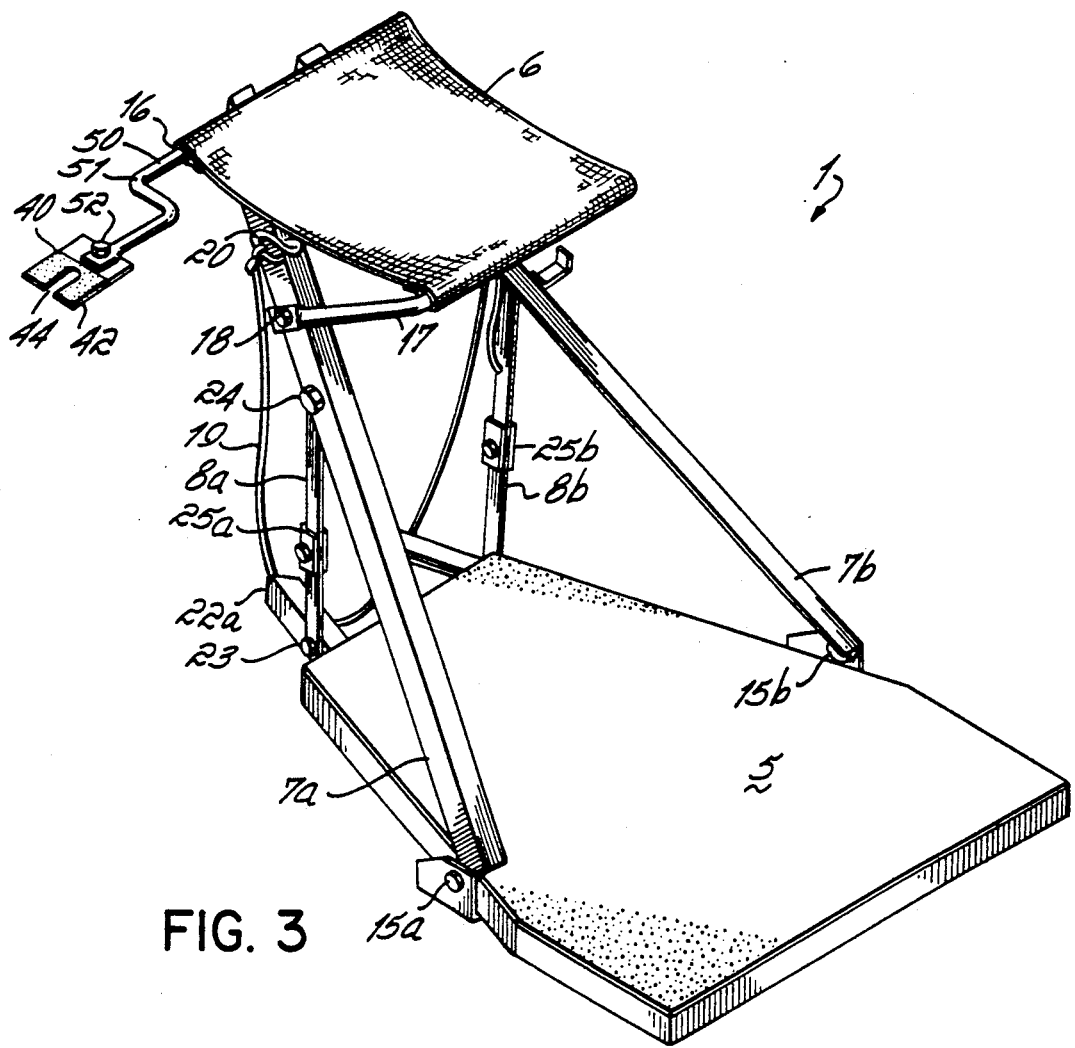
FIG. 3 is a perspective view of an alternative embodiment of the present invention.
Figure 3A:
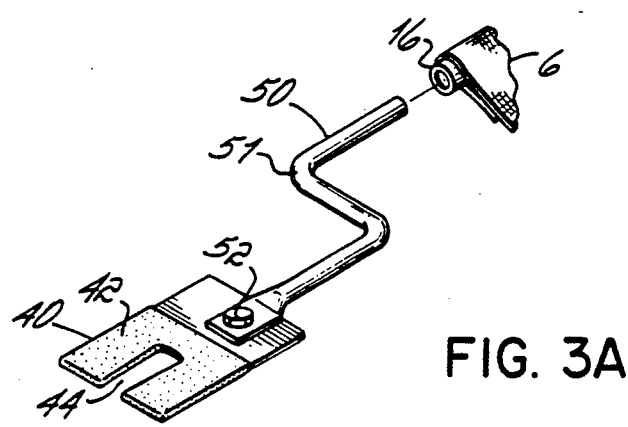
FIG. 3a is a perspective view of the bow supporting tubular arm of FIG. 3.

With reference to FIGS. 3 and 3a, there will be seen an alternative embodiment of the present invention. With like numbers designating like components, the tree stand 1 of this embodiment includes a tubular structural member 50 one end of which is slipped or slid into one end of the tubular frame member 16. The tubular member 50 may be secured in frame member 16 by any suitable conventional means, such as by use of a cotter pin or the like. This tubular structural member 50 includes a dog leg 51 intermediate its ends, and has fixedly secured to its other end the generally U-shaped bracket 40 of the present invention. The bracket 40 is fixedly secured to the tubular member 50 by way of bolt 52. It will be appreciated that since the member 50 may be simply slipped or slid into or out of the tubular frame member 16, when the stand 1 is folded for transportation this may be removed and simply slipped into a pocket to carry.

Figure 4:
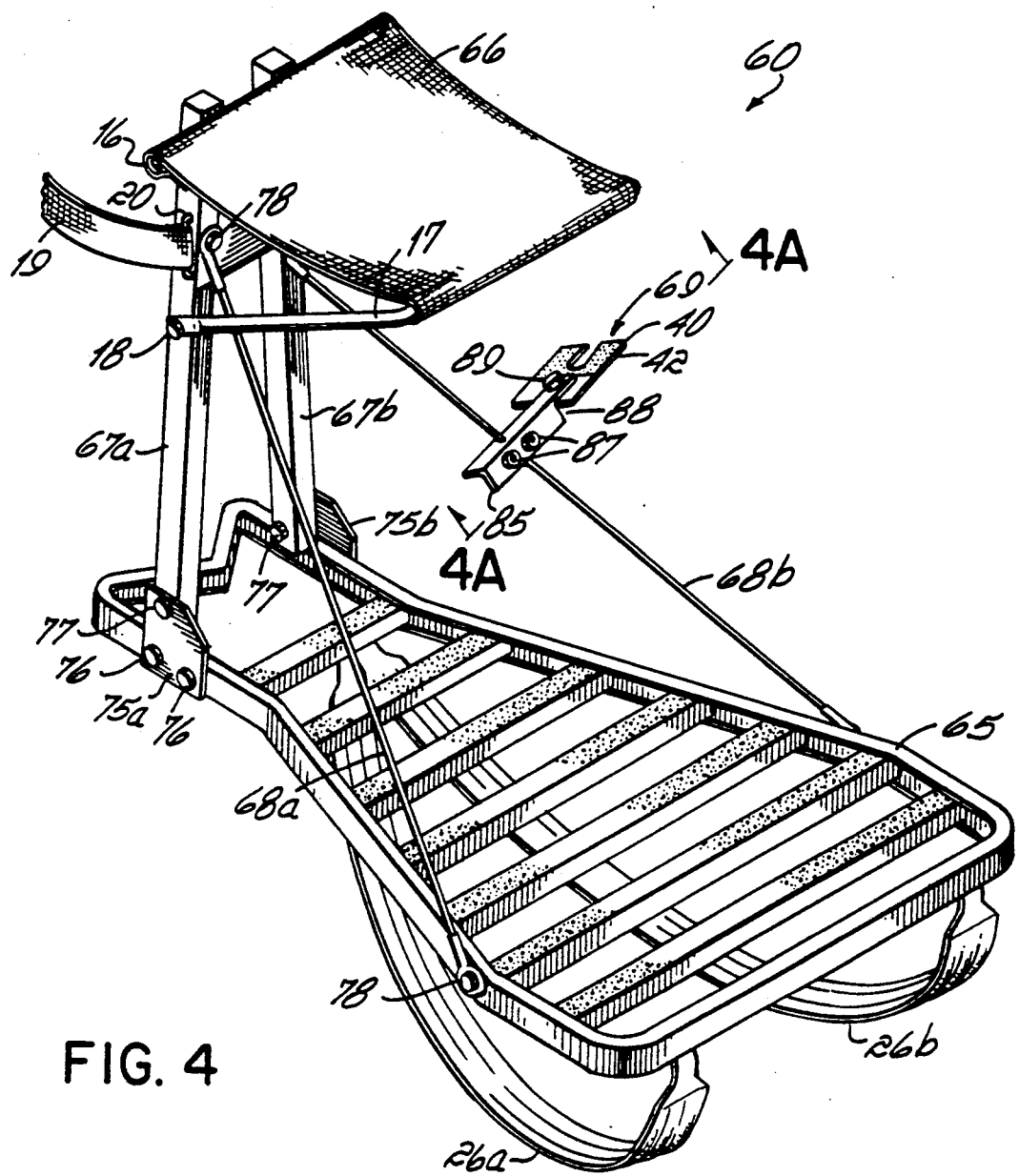
FIG. 4 is a perspective view of yet another embodiment of the present invention.
Figure 4A:
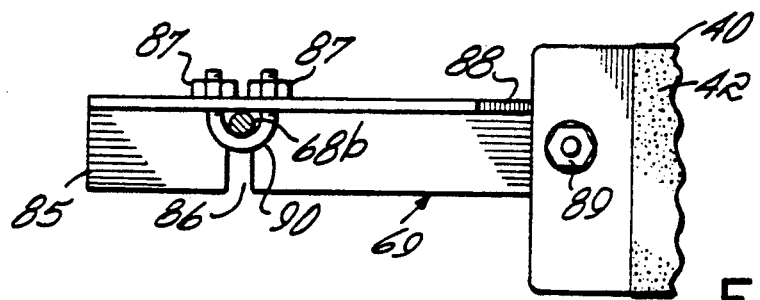
FIG. 4a is a perspective view of the bow supporting arm of FIG. 4.

With reference to FIGS. 4 and 4a there is illustrated yet another embodiment of the present invention. In this embodiment, the tree stand 60 comprises a platform 65, a seat 66, vertical frame members 67a and 67b connected between the platform 65 and seat 66, and diagonal cables 68a and 68b connected between the platform 65 and the vertical frame members 67a and 67b. The bow support 69, while depicted secured to the cable 68b, may be attached to either of the cables 68a, 68b.

Gusset plates 75a and 75b are fixedly connected to the platform 65 with bolts 76. The vertical frame members 67a and 67b are pivotally connected to the gusset plates 75a and 75b, respectively, with pivots 77. The cables 68a and 68b are connected on their ends via bolts 78 to the platform 65 and the vertical frame members 67a and 67b.

Describing the bow support 69 of this embodiment now in more detail, this bow support 69 comprises a short length of angle section 85 which is notched at 86 to allow the angle section 85 to fit or otherwise be placed over the cable 68b. This angle section 85 is secured to the cable 68 via a U-bolt 90 and nuts 87. The angle section 85 is relieved at 88 to allow the bracket 40 to be attached thereto by way of bolt 89.

Use of the present invention is readily apparent with reference to the Figures. For example, it will be appreciated that a hunter seated atop seat 6 of stand 1 (FIG. 1) sipping a cup of coffee may, upon sighting a trophy buck, quickly and quietly place his coffee cup on platform 5 and reach over and grasp bow 43 by its handle 45 in support 9. The hunter need only then move bow 43 outwardly a small distance so as to clear the notch 44 in bracket 40, and then bring bow 43 upwards to a forward position wherein it may readily be drawn. Similarly, the other embodiments (FIGS. 3 and 4) permit ease of use of the bow 43 when desired. And, it will be appreciated that the present invention may readily be adapted for either right hand (FIG. 1), or left hand (FIG. 4) use, as desired.

While I have described only three embodiments of my invention, those skilled in the art will readily recognize adaptations and modifications which can be made to the present invention which will result in an improved portable tree stand, yet without departing from the spirit or scope of the present invention. Accordingly, I intend to be limited only by the scope of the appended claims.

What is claimed is:

1. A portable hunting tree stand adapted to be removably connected to a tree trunk comprising:
    a platform,
    a seat,
    at least one frame member connected between said seat and said platform,
    arm means pivotally connected on a first end to said frame member and being operable to pivot between a first position generally adjacent and parallel to said frame member and a second position generally perpendicular to said frame member, said arm means having an edge adapted to engage said frame member to maintain a spaced relationship between said arm means and said frame member, and
    bracket means connected to a second end of said arm means and being operable for removable placement of a hunting bow therein,
    whereby the bow may be supported in said bracket means slightly forward of a hunter seated atop said seat and laterally spaced away from a lateral edge of said platform.

2. The tree stand of claim 1 wherein said arm means is an angle section structural member.

3. The tree stand of claim 2 wherein said edge is an edge of a relieved portion in a leg of said angle section structural member at said first end, said edge engaging said frame member whereby gravity maintains said edge of said structural member in contact with said frame member.

4. The tree stand of claim 3 wherein said bracket is generally U-shaped.

5. The tree stand of claim 4 wherein said bracket is rubber coated so as to muffle sound and prevent marring of the bow when the bow is placed into or removed from said bracket.

6. A portable hunting tree stand adapted to be removably connected to a tree trunk comprising:
    a platform,
    a seat,
    at least a first frame member connected between said seat and said platform,
    at least a second tubular frame member connected to said first frame member and forming a rear edge of said seat,
    arm means connected on a first end to an end of said second tubular frame member, said arm means including a bend therein thereby placing a second end thereof forward of said rear edge of said seat, and
    bracket means connected to said second end of said arm means and being operable for removably placement of a hunting bow therein,
    wherein the bow may be supported in said bracket means generally forward of said rear edge of said seat and laterally spaced away from a lateral edge of said seat.

7. The tree stand of claim 6 wherein said arm is a tubular section structural member.

8. The tree stand of claim 7 wherein said bracket is generally U-shaped.

9. The tree stand of claim 8 wherein said bracket is rubber coated so as to muffle sound and prevent marring of the bow when the bow is placed into or removed from said bracket.

10. A portable hunting tree stand adapted to be removably secured to a tree trunk comprising:
    a platform,
    a seat,
    at least one frame member connected between said seat and said platform,
    at least one cable connected between said frame member and said platform,
    arm means connected of a first end to said cable, and
    bracket means connected to a second end of said arm means and being operable for removable placement of a hunting bow therein, whereby the bow may be supported in said bracket means slightly forward of a hunter seated atop said seat and laterally spaced away from a lateral edge of said platform.

11. The tree stand of claim 10 wherein said arm is an angle section structural member.

12. The tree stand of claim 11 wherein said bracket is generally U-shaped.

13. The tree stand of claim 12 wherein said bracket is rubber coated so as to muffle sound and prevent marring of the bow when the bow is placed into or removed from said bracket.

* * * * *